United States Patent
Nakayama

[11] Patent Number: 5,861,876
[45] Date of Patent: Jan. 19, 1999

[54] POSITION DETECTING APPARATUS

[75] Inventor: Masayuki Nakayama, Tokyo, Japan

[73] Assignee: Sony Corporation, Tokyo, Japan

[21] Appl. No.: 507,873

[22] Filed: Jul. 27, 1995

Related U.S. Application Data

[63] Continuation of Ser. No. 250,534, May 31, 1994, abandoned.

[30] Foreign Application Priority Data

May 31, 1993 [JP] Japan .................................. 5-149745

[51] Int. Cl.⁶ ...................................................... G09G 5/00
[52] U.S. Cl. .................... 345/179; 178/18.01; 178/18.09
[58] Field of Search .............................. 178/18.01, 18.09, 178/19.01; 345/163, 164, 165, 166, 179, 180, 181, 182, 183

[56] References Cited

U.S. PATENT DOCUMENTS

| | | | |
|---|---|---|---|
| 4,541,689 | 9/1985 | Howard et al. | 345/179 |
| 5,027,115 | 6/1991 | Sato et al. | 345/179 |
| 5,291,213 | 3/1994 | Krauss | 345/179 |

FOREIGN PATENT DOCUMENTS

| | | |
|---|---|---|
| 413607 A | 2/1991 | European Pat. Off. . |
| 3407131 A | 8/1985 | Germany . |

Primary Examiner—Vivian Chang
Attorney, Agent, or Firm—Jay H. Maioli

[57] ABSTRACT

A position detecting apparatus includes a ball on which dots are magnetically recorded so as to form a repetitive pattern (dot pattern) provided at a front end portion of a pen-type case and a magnetic head 4 having detecting elements arranged in a matrix form to detect the repetitive pattern and to output position detection information corresponding to the detection result. Because the dot pattern is magnetically recorded on the ball, it is possible to precisely record the dot pattern on a ball having a diameter of the several mm, and the position detecting apparatus can become compact through miniaturization of the ball. In addition, abrasion by friction, etc. of dot pattern can be prevented by the magnetic recording thereby contributing to detection of a precise dot pattern. Such a dot pattern also may be magneto-optically recorded. In addition, a second ball in contact with the first ball and having a portion exposed to the external portion of the case may be preferably provided.

5 Claims, 11 Drawing Sheets

| D1 | D2 | D3 | D4 | D5 | D6 | D7 | D8 | D9 |
|----|----|----|----|----|----|----|----|----|
| 0  | 0  | 0  | 0  | 0  | 0  | 1  | 0  | 0  |

FIG.5(a)

| D1 | D2 | D3 | D4 | D5 | D6 | D7 | D8 | D9 |
|----|----|----|----|----|----|----|----|----|
| 0  | 0  | 0  | 1  | 0  | 0  | 0  | 0  | 0  |

FIG.5(b)

| X-DIRECTION OUTPUT | Y-DIRECTION OUTPUT |
|--------------------|--------------------|
| 0                  | +1                 |

FIG.5(c)

POSITION DETECTING APPARATUS

This is a continuation of application Ser. No. 08/250,534, filed May 31, 1994, now abandoned.

BACKGROUND OF THE INVENTION

1. Field of the Invention

This invention relates to a position detecting apparatus adapted for detecting a change, etc. of position resulting from movement based on manual operation to deliver information thereof to a computer system, etc.

2. Description of the Related Art

Hitherto, it was not possible to move the cursor (or pointer) on a display screen of a computer system unless an operator (or user) operates key board. In recent years, however, cursor control has been connected to a serial port of the computer system, thereby making it possible to move the cursor more freely than the key board.

As an example of one of such cursor controllers, there is known a so called mouse having an outside dimension as large as the palm of the hand and having a ball rotatably provided therewithin. In operation, the human being holds the mouse by the hand to move it on a desk, whereby the ball rotates. Rotation of the ball is detected by an optical encoder. This optical encoder detects rotation of the ball to thereby form position information for moving the cursor and distance information indicating the distance to deliver the information to the computer system through the serial port. The computer system gives an indication to move the cursor on the display screen on the basis of the position information and the distance information delivered from the optical encoder to display picture data corresponding thereto.

As another cursor controller, a so called tablet is known. In the case of the tablet, an operator moves a stay write pen on a dedicated board comprised of an optical grid to thereby count signals indicating the number of crossing times of the optical grid to detect the direction and the position to deliver respective detection information thus obtained to the computer system. The computer system gives an indication to move the cursor on the display screen on the basis of the respective detection information.

Further, in the Japanese Patent Application Laid Open No. 120424/1985 (Tokkaisho No. 60-120424), there is disclosed a position detecting apparatus in which a plurality of marks disposed equidistantly from each other are painted on the spherical surface of a sphere provided at one end of a tubular case and light is irradiated onto these marks and rays of reflected light are detected by using an optical detector, thus position information and distance information are outputted However, since the mouse has dimensions as large as the palm of the hand of a human being, and an operator is therefore required to hold the mouse in a manner to cover it from above when in use, movement of the hand in a manner different from that when the operator usually holds the mouse is required for inputting characters or graphics to the computer system, resulting in the problem that the operability is poor.

Further, the tablet requires a dedicated board that is paired with the stay write pen, resulting in the problem that movement of the stay write pen is limited also by the dimensions of the board.

In addition, the position detecting apparatus disclosed in the Japanese Patent Application Laid Open No. 120424/1985 (Tokkaisho No. 60-120424) is compact as compared to the mouse, and does not require a dedicated board which was required for the tablet. However, since predetermined marks are painted on the spherical surface of the sphere, there is the problem in durability that those marks are peeled away when such position detecting apparatus is used for long time. Further, in order to allow the human being to use the position detector in the same manner as in the case where the human being ordinarily uses the pen, it is necessary to reduce the shape itself approximately to that of a so called ball-point pen. Followed by this, it is necessary to reduce the dimension of the sphere to approximately several mm. For this reason, it becomes difficult to precisely paint marks on the sphere itself, thus disadvantageously failing to precisely carry out position detection.

OBJECT AND SUMMARY OF THE INVENTION

With the above in view, an object of this invention is to provide a position detecting apparatus having durability and good operability, and capable of precisely carrying out position detection.

To achieve the above-mentioned object, in accordance with this invention, there is provided a position detecting apparatus comprising: a tubular case, a ball on which a predetermined repetitive pattern by magnetic recording is recorded, the ball being provided at one end of the tubular case so that it can rotate in desired directions; magnetic detecting means provided within the case in a manner close to the ball and having detecting portions arranged in a matrix form, which detect the repetitive pattern magnetically recorded on the ball; and position detecting means for carrying out position detection on the basis of a detection output from the magnetic detecting means.

Further, in accordance with this invention, there is provided a position detecting apparatus comprising: a tubular case; a ball on which a predetermined repetitive pattern by magneto-optical recording is recorded, the ball being provided at one end of the tubular case so that it can rotate in desired directions; a light source provided within the case and adapted to irradiate light onto the ball; magneto-optical detecting means having detecting portions arranged in a matrix form provided within the case and adapted to receive a reflected light produced by irradiation to the ball of light from the light source to detect the repetitive pattern magneto-optically recorded on the ball; and position detecting means for carrying out position detection on the basis of a detection output from the magneto-optical detecting means.

In addition, in accordance with this invention, there is provided a position detecting apparatus, further comprising a second ball provided at one end of the tubular case so that it can rotate in desired directions and is in contact with the ball on which the predetermined pattern is recorded, the ball on which the predetermined pattern is recorded being provided within the case, and rotating in a manner interlocking with the ball provided at one end of the case.

As stated above, since the position detecting apparatus according to this invention carries out magnetic recording or magneto-optical recording of a predetermined repetitive pattern for carrying out position detection, which is to be recorded on the ball, it is possible to precisely record the repetitive pattern on the ball, e.g., at several tens $\mu$m~several hundreds $\mu$m. Further, since it is possible to precisely record the repetitive pattern at several tens $\mu$m~several hundreds $\mu$m, the size of the ball itself can be reduced to, e.g., less than several mm. Followed by this, this position detecting apparatus itself can become compact so that it is as small as a so called ball-point pen. Thus, operability can be improved.

Furthermore, since the repetitive pattern is caused to undergo magnetic recording or magneto-optical recording, an inconvenience such that the painted repetitive pattern is peeled away as in the case where that repetitive pattern is painted is prevented. This can not only contribute to precise position detection, but also to improved durability.

From the desciption above, the position detecting apparatus can become more compact than the conventional so called mouse, and can improve operability more than the mouse. Further, since any dedicated board as in the case of the conventional tablet is not required, the apparatus can become compact to much larger degree, and can be made up at low cost, thus making it possible to contribute to popularization of the computer system.

Further, since position information and distance information outputted from this position detection apparatus are exactly the same as position information and distance information outputted from the conventional so called mouse, existing computer systems, etc. can be used as they are without altering or modifying those computer systems.

Further, in the case where there is employed a method of magneto-optically recording a predetermined repetitive pattern on the ball to detect the magneto-optically recorded repetitive pattern by using magneto-optical detecting means, these is no change of focal point of a reflected light irradiated onto the magneto-optical detecting means. For this reason, it is unnecessary to provide a servo system for focus control, etc. The configuration of the position detecting apparatus can be extremely simple, thus making it possible to contribute to realization of low cost.

In addition, in accordance with the position detecting apparatus, since a second ball is provided at one end of the tubular case so that it can rotate in desired directions, and is in contact with the ball on which the repetitive pattern is recorded, the ball on which the repetitive pattern is caused to undergo magnetic recording or magneto-optical recording can be prevented from being directly in contact with the desk. For this reason, the magnetically recorded or magneto-optically recorded repetitive pattern can be prevented from being magnetized. Thus, the durability can be still more improved.

BRIEF DESCRIPTION OF THE DRAWINGS

FIGS. 5(a)~(c) are model views for explaining the manner of position detection of the position detecting apparatus according to the first embodiment.

DESCRIPTION OF THE PREFERRED EMBODIMENTS

Preferred embodiments of a position detecting apparatus according to this invention will now be described with reference to the attached drawings.

The position detecting apparatus according to this invention is directed to a position detecting apparatus adapted to output position information and distance information for a moving cursor, etc. displayed on a display screen of computer system.

Figure 1:
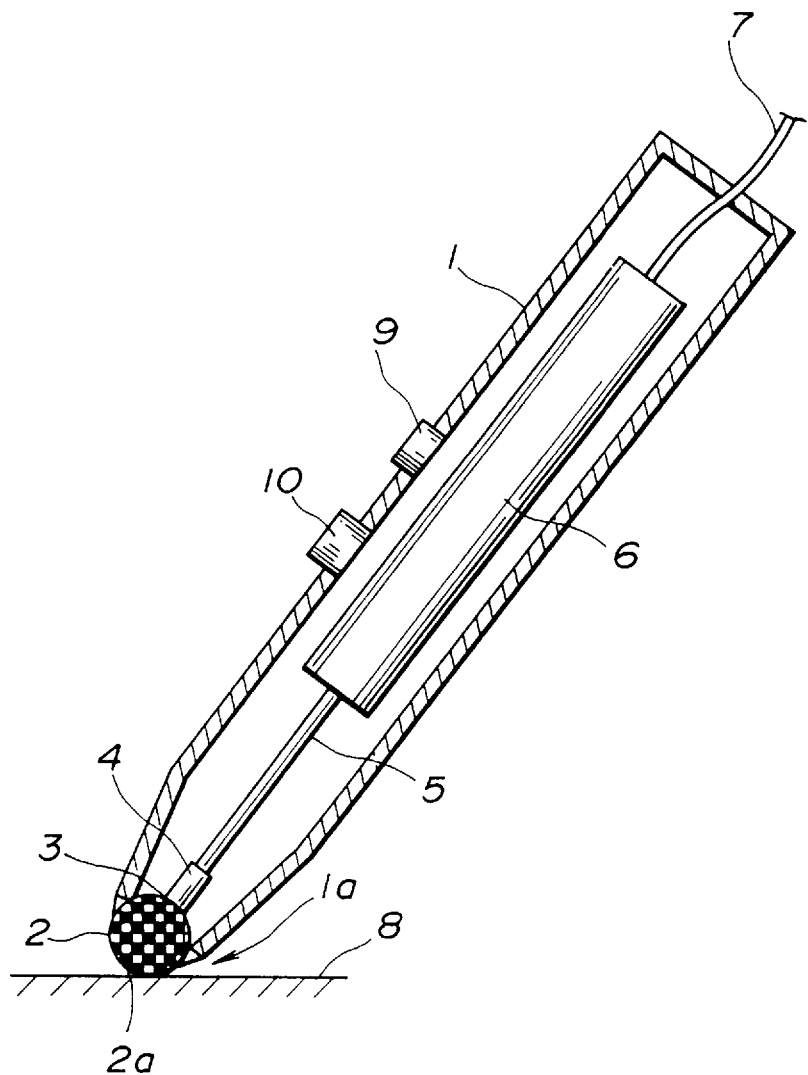
FIG. 1 is a cross sectional view showing the configuration of a position detecting apparatus according to a first embodiment of this invention.

Initially, the position detecting apparatus according to the first embodiment of this invention is of a structure such that a ball 2 having a diameter less than several mm is rotatably provided at a front end portion 1a of a tubular case 1 having an appearance of a so called ball-point pen as shown in FIG. 1. On the surface of the ball 2, several thousands (or several hundreds) of dots 2a are repeatedly magnetically recorded at intervals of several hundreds $\mu$m (or at intervals of several thousands $\mu$m).

Within the case 1, there are provided a magnetic head 4 having a detecting section 3 of a magnetic flux responsive Hall element or MR element for detecting the dot pattern magnetically recorded on the ball 2, and a processing circuit 6 connected through a connection line 5 to the magnetic head 4 and adapted to carry out position detection from a detection output from the magnetic head 4.

Further, there are provided, on the case 1, an index 9 indicating whether the position detecting apparatus is directed upwardly or downwardly when a user holds it, and a click switch 10 for clicking the cursor on the display screen of the computer system.

Figure 2:
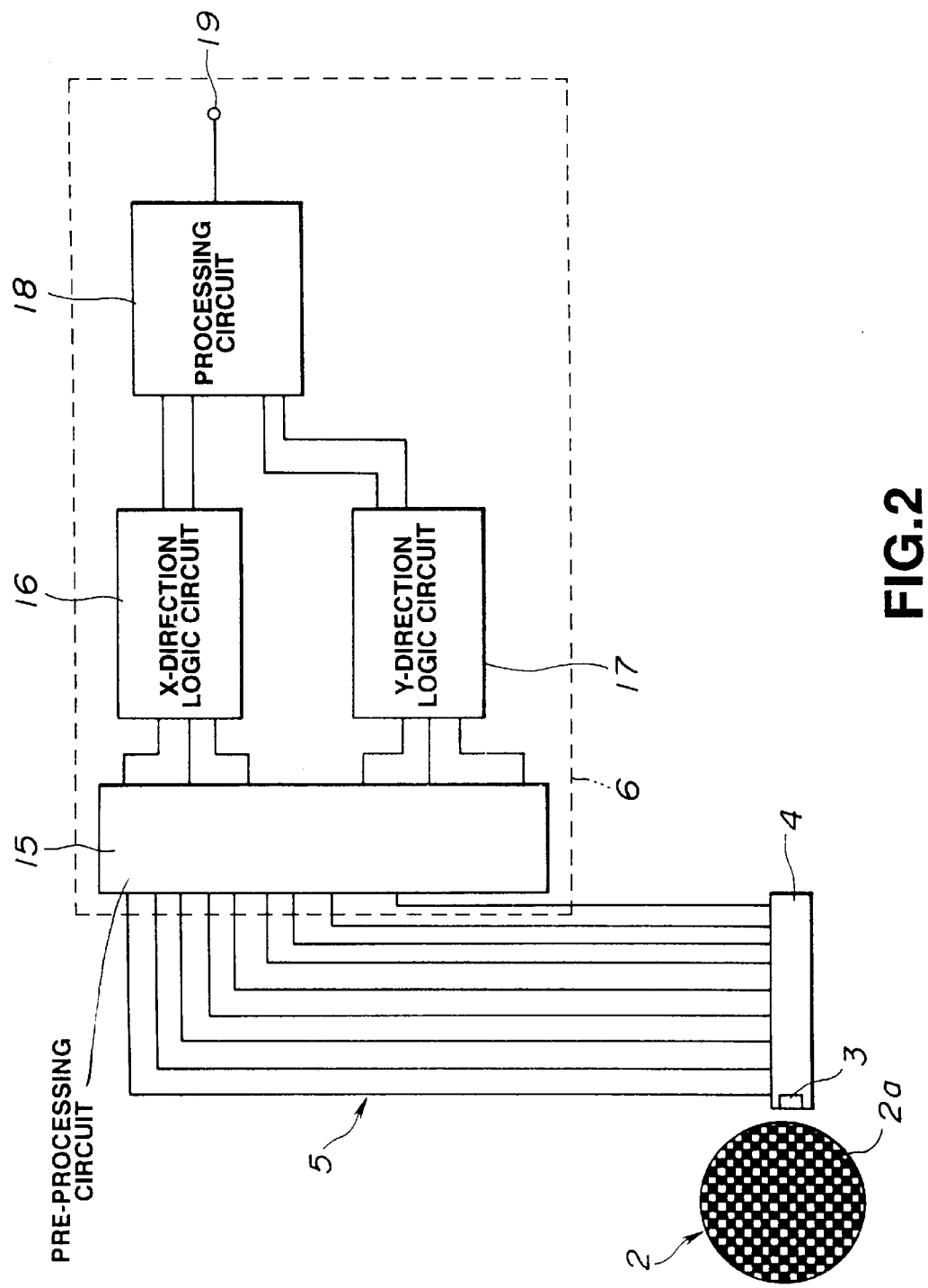
FIG. 2 is a block diagram showing an electric configuration of the position detecting apparatus according to the first embodiment.

The above-mentioned processing circuit 6 is composed, as shown in FIG. 2, of a pre-processing circuit 15 for carrying out pre-processing of position information and distance information detected by the magnetic head 4, an X-direction logic circuit 16 for detecting a quantity of the movement of ball 2 in the X-direction on the basis of outputs from the pre-processing circuit 15, a Y-direction logic circuit 17 for detecting a quantity of movement of the ball 2 in the Y-direction perpendicular to the X-direction on the basis of outputs from the pre-processing circuit 15, and a post-processing circuit 18 for detecting movement direction and a movement distance of the ball 2 on the basis of outputs from the X-direction logic circuit 16 and the Y-direction logic circuit 17 to deliver position information and distance information to the computer system through the output terminal 19.

Figure 3:
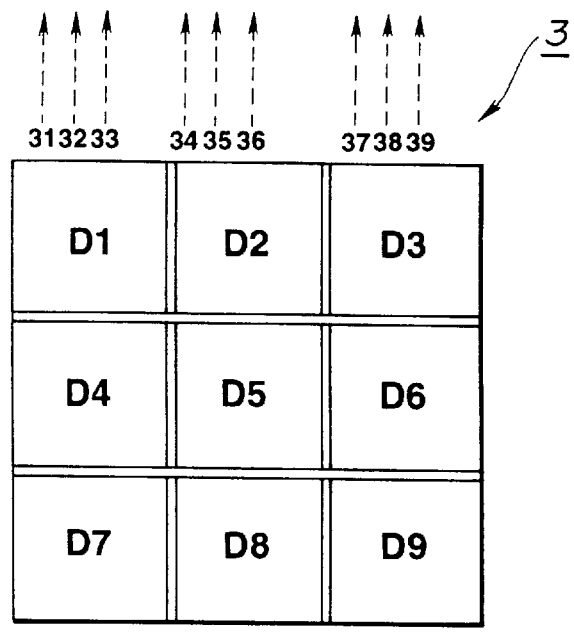
FIG. 3 is a model view showing detecting elements provided in the position detecting apparatus according to the first embodiment.
Figure 4:
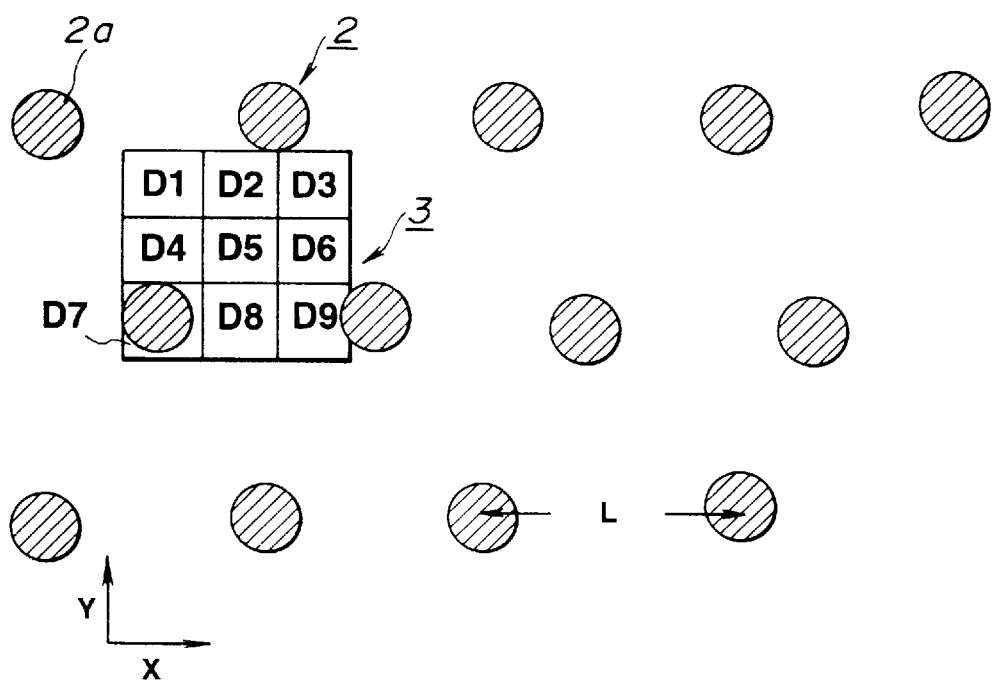
FIG. 4 is a model view for explaining the manner of position detection of the position detecting apparatus according to the first embodiment.

Further, the detecting section 3 provided within the magnetic head 4 is composed, as shown in FIG. 3, of first~ninth detecting elements D1~D9 having detecting areas in a matrix form. It is to be noted that the dimensions of the detecting areas of respective detecting elements D1~D9 are slightly larger than the diameter of dot 2a of the ball 2 as shown in FIG. 4. In addition, the recording interval between the dots 2a indicated by L in FIG. 4 is slightly larger than the width corresponding to three detecting elements.

The operation of the position detecting apparatus according to the first embodiment of this invention thus constructed will now be described.

First, a user holds the position detecting apparatus in a manner of a ball-point pen with the index 9 being positioned in an upper direction to move the ball 2 in the state in contact with the desk 8, etc. Thus, the ball 2 rotates by friction of the ball 2 and the desk 8. As a result, dots 2a are passed through the nine detecting elements D1~D9.

These detecting elements D1~D9 detect dots 2a passed therethrough to thereby form and output signals indicating movement direction and a movement distance.

In a more practical sense, assuming now that the dot 2a is assumed to be positioned only on the seventh detecting element D7 when the ball 2 does not rotate as shown in FIG. 4, for example, detection signals of a low level (0) are outputted from the first~sixth detecting elements D1~D6, a detection signal of a high level (1) is outputted from the seventh detecting element D7, and detection signals of a low level (0) are outputted from the eighth and ninth detecting elements D8, D9 as shown in FIG. 5(a).

Figure 6:
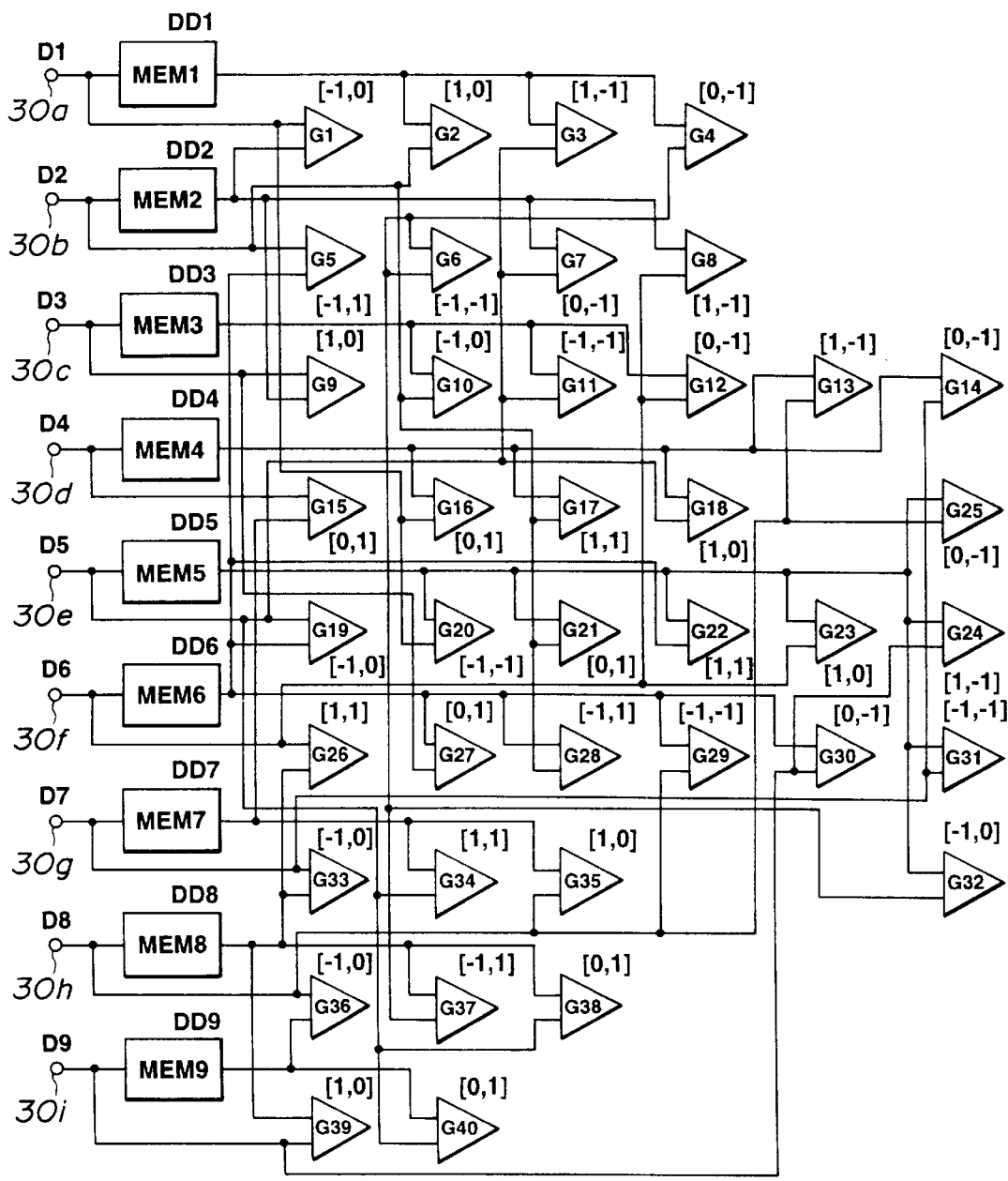
FIG. 6 is a circuit diagram showing a portion of the first half of a processing circuit provided in the position detecting apparatus according to the first embodiment.

Respective detection signals from the detecting elements D1~D9 are delivered to the processing circuit 6 through the connection line 5. The first half of the processing circuit 6 is constructed as shown in FIG. 6. The first~ninth memories MEM1~MEM9 shown in FIG. 6 are memories for respectively storing detection signals obtained the last time.

When it is now assumed that the ball 2 is rotated and the dot 2a which has been positioned on the seventh detecting element D7 is moved onto the fourth detecting element D4, a signal of a high level is in turn outputted only from the fourth detecting element D4 as shown in FIG. 5(b).

Figure 7:
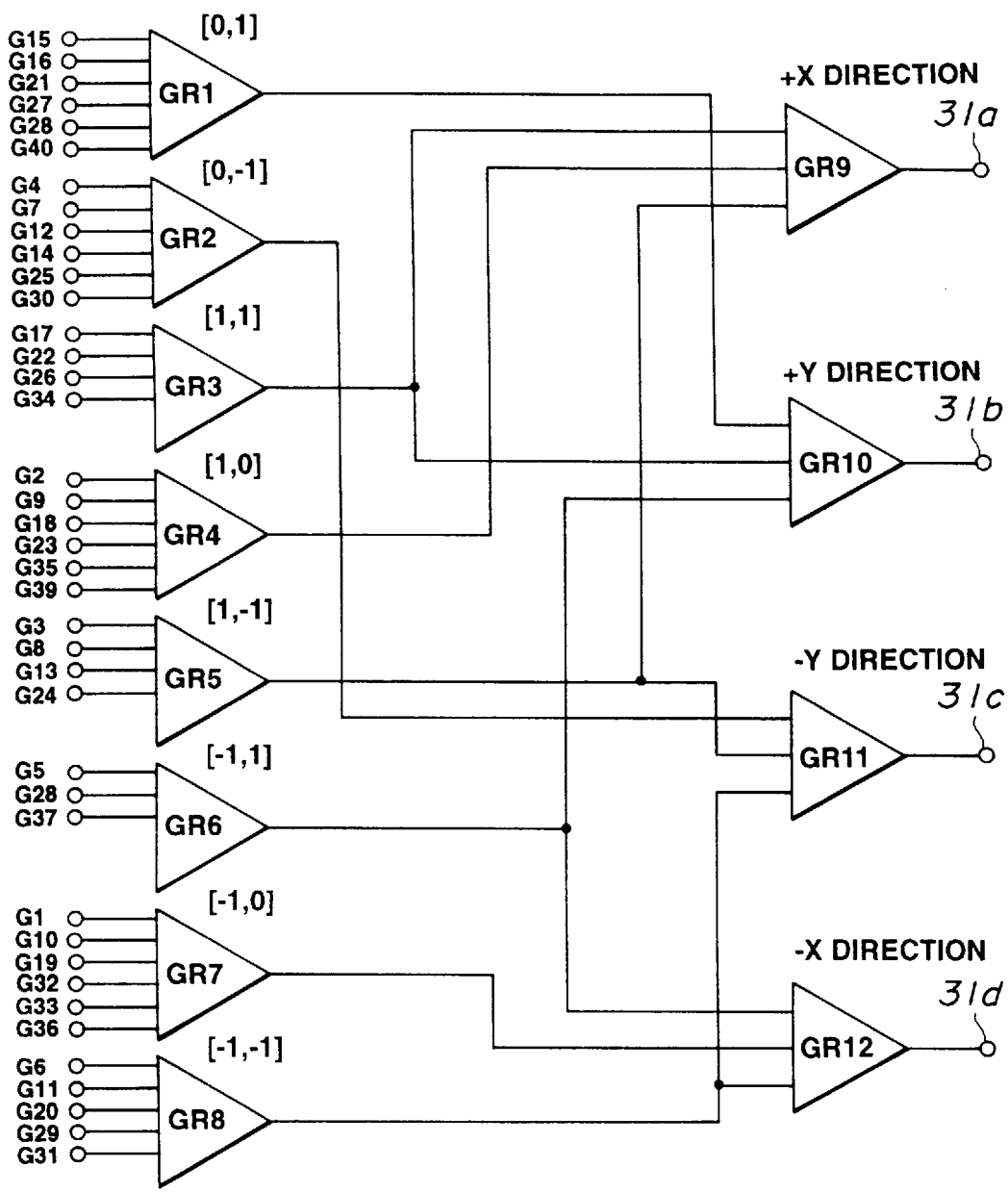
FIG. 7 is a circuit diagram showing a portion of the latter half of the processing circuit provided in the position detecting apparatus according to the first embodiment.

The first~fortieth comparators G1~G40 shown in FIG. 6 compare detection signals delivered from the respective detecting elements D1~D9 at the present and the last detection signals delivered from the respective memories MEM1~MEM9 to thereby output comparison signals, respectively. Comparison signals from the fifteenth, sixteenth, twenty first, twenty seventh, thirty eighth and fortieth comparators G15, G16, G21, G27, G38, G40 are delivered to the first comparator GR1 of the latter half of the processing circuit 6 shown in FIG. 7; comparison signals from the fourth, seventh, twelfth, fourteenth, twenty fifth and thirtieth comparators G4, G7, G12, G14, G25, G30 are delivered to the second comparator GR2 of the latter half of the processing circuit 6 shown in FIG. 7; and comparison signals from the seventeenth, twenty second, twenty sixth, and thirty fourth comparators G17, G22, G26, G34 are delivered to the third comparator GR3 of the latter half of the processing circuit 6 shown in FIG. 7. Further, comparison signals from the second, ninth, eighteenth, twenty third, thirty fifth and thirty ninth comparators G2, G9, G18, G23, G35, G39 are delivered to the fourth comparator GR4 of the latter half of the processing circuit 6 shown in FIG. 7; comparison signals from the third, eighth, thirteenth, twenty fourth comparators G3, G8, G13, G24 are delivered to the fifth comparator GR5 of the latter half of the processing circuit 6 shown in FIG. 7; and comparison signals from the fifth, twenty eighth, thirty seventh comparators G5, G28, G37 are delivered to the sixth comparator GR6 of the latter half of the processing circuit 6 shown in FIG. 7. In addition, comparison signals from the first, tenth, nineteenth, thirty second, thirty third and thirty sixth comparators G1, G10, G19, G32, G33, G36 are delivered to the seventh comparator GR7 of the latter half of the processing circuit 6 shown in FIG. 7; and comparison signals from the sixth, eleventh, twentieth, twenty ninth, thirty first comparators G6, G11, G20, G29, G31 are delivered to the eighth comparator GR8 of the latter half of the processing circuit 6 shown in FIG. 7.

The first~eighth comparators GR1~GR8 respectively compare comparison signals to deliver these comparison outputs to the ninth~twelfth comparators GR9~GR12. It is to be noted that comparison outputs from the third~fifth comparators GR3~GR5 are delivered to the ninth comparator GR9, and comparison outputs from the first, third and sixth comparators GR1, GR3, GR6 are delivered to the tenth comparator GR10. In addition, comparison outputs from the second, fifth and eighth comparators GR2, GR5, GR8 are delivered to the eleventh comparator GR11; and comparison outputs from the sixth~eighth comparators GR6~GR8 are delivered to the twelfth comparator GR12.

The ninth~twelfth comparators GR9~GR12 detect on the basis of respective comparison outputs whether the direction of movement of dots 2a is in an X-direction or Y-direction. In this case, as shown in FIGS. 5(a) and 5(b), since the dot 2a which has been present on the seventh detecting element D7 is moved onto the fourth detecting element D4, signals indicating that the ball 2 is not moved in the X-axis direction, but is moved by one element only in the Y-axis direction as shown in FIG. 5(c) are respectively outputted from the ninth~twelfth comparators GR9~GR12. Namely, a detection signal of a high level is outputted from the ninth comparator GR9, and detection signals of a low level are outputted from the tenth~twelfth comparators GR10~GR12. Detection signals from the respective comparators GR9~GR12 are outputted from output terminals 31a~31d, and are delivered to the mouse input of the computer system through connection line 7 shown in FIG. 1.

Thus, it is possible to move (move in the X-direction in this case) the cursor on the display screen of the computer system.

As stated above, in the position detecting apparatus according to the first embodiment of this invention, since the dot pattern for carrying out position detection is magnetically recorded on the ball 2, it is possible to precisely record the dot pattern, e.g., at intervals of several tens $\mu$m~several hundreds $\mu$m on the ball 2. Further, since it is possible to precisely magnetically record the dot pattern at the intervals of several tens $\mu$m~several hundreds $\mu$m, the size of the ball 2 itself can be reduced to less than, e.g., several mm. Followed by this, the dimensions of the position detecting apparatus itself can be reduced to the dimensions of a, so called ball-point pen. Thus, operability can be improved. Further, since the dot pattern is magnetically recorded, an inconvenience such that the dot pattern is peeled away as in the case where the dot pattern is painted can be prevented. Such a method of magnetically recording the dot pattern can contribute to precise position detection. Thus, durability can be also improved.

From the description above, this position detecting apparatus can become more compact than the conventional so-called mouse, and the operability can be improved to a greater degree than the mouse. Further, since any dedicated board as in the case of the conventional tablet is not required, the position detecting apparatus can become compact to much larger degree, and can be made up at a low cost. This can contribute to popularization of the computer system.

Further, since position information and distance information outputted from the position detection apparatus are exactly the same as position information and distance information outputted from a conventional so called mouse, existing computer systems, etc. can be used as they are without altering or modifying those computer systems, etc.

A second embodiment of a position detecting apparatus according to this invention will now be described. It is to be noted that explanation will be given with the same reference numerals being attached to the same portions of the first embodiment, respectively.

While the position detecting apparatus according to the first embodiment is adapted so that a dot pattern is magnetically recorded on the ball 2, the position detecting apparatus according to the second embodiment is adapted so that the dot pattern is magneto-optically recorded.

Figure 8:
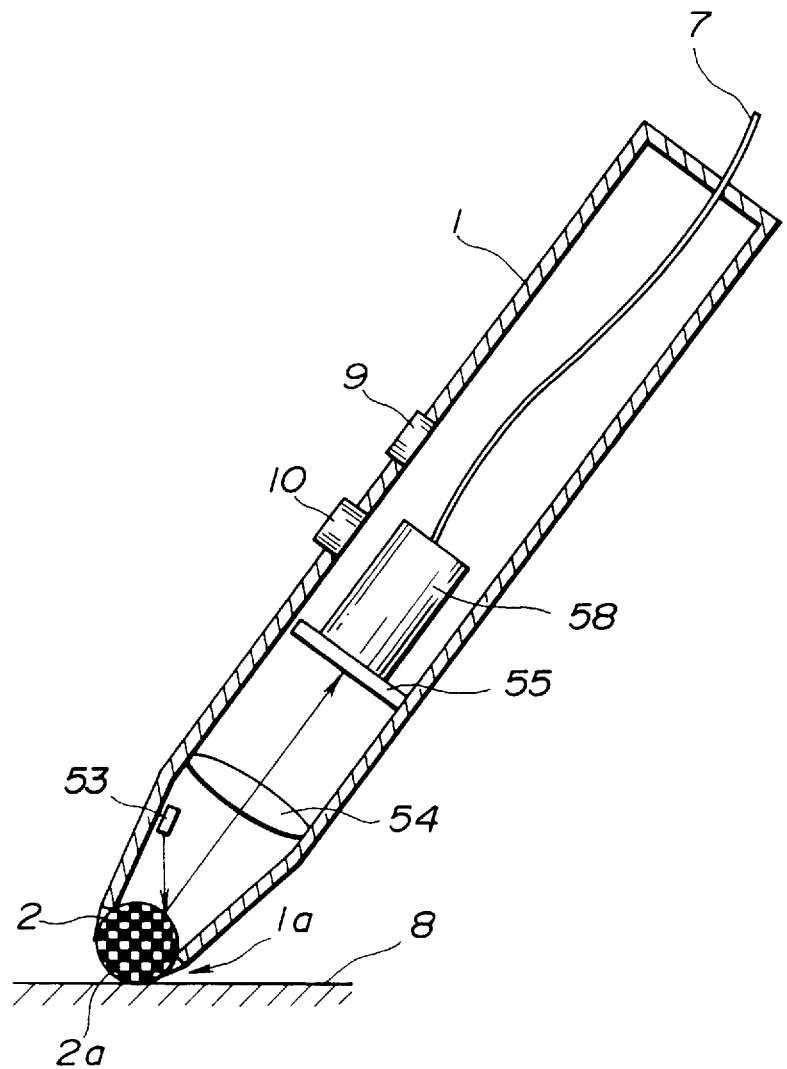
FIG. 8 is a cross sectional view showing the configuration of a position detecting apparatus according to a second embodiment of this invention.

Namely, in the position detecting apparatus according to the second embodiment, the ball 2 having a diameter less than several mm is rotatably provided at a front end portion 1a of the tubular case 1 having a shape of, a so called ball-point pen as shown in FIG. 8. Recording magnetic material is coated, vacuum-deposited or sputtered on the surface of the ball 2, and several thousands (or several hundreds) of dots 2a are repeatedly recorded in advance at intervals of several hundreds μm (or at intervals of several thousands μm).

Within the case 1, there are provided a light source 53 for irradiating a laser beam onto the ball 2, an object lens (objective) 54 for focusing a reflected light produced as a result of the fact that the laser beam from the light source 53 is irradiated onto the ball 2, a photo detector 55 adapted to receive a reflected light focused by the object lens 54 to detect a change of the reflected light by movement of the magnetization pattern to output a signal indicating the change of the reflected light, and a processing circuit 58 for forming position information and distance information of the dots 2a on the basis of the signal indicating the change of the reflected light from the photo detector 55 to deliver them to the mouse input of the computer system through connection line 7.

Further, on the case 1, there are provided an index 9 indicating whether the position detector is directed upwardly or downwardly when a user holds it, and a click switch 10 for clicking the cursor on the display screen of the computer system.

The photo detector 55 is of a structure as shown in FIG. 3 such that the inner portion thereof is divided into nine light receiving areas in a matrix form. It is to be noted that the size of each of the light receiving areas of the photo detector 55 is slightly larger than the diameter of the magneto-optically recorded dot 2a. In addition, the magnification of the object lens 54 is adjusted to such an extent that the pitch of a reflected light irradiated onto the photo detector 55 is slightly larger than the width corresponding to three light receiving areas.

In the position detector according to the second embodiment thus constructed, at the time of detection of position, a laser beam is irradiated onto the ball 2 from the light source 53. A reflected light produced thereby is focused by the object lens 54, and is irradiated onto the photo detector 55. By rotation of the ball 2, the dot 2a moves. Followed by this, the reflected light changes. The photo detector 55 receives the reflected light by the respective light receiving areas to form a signal indicating a change of the reflected light to deliver it to the processing circuit 58. The processing circuit 58 has the same configuration as that of the processing circuit 6, and detects movement direction and the movement distance of the dot 2a of the ball 2 as described above on the basis of the signal indicating the change of the reflected light from the photo detector 55 to deliver them to the computer system through the connection line 7. Thus, it is possible to move the cursor on the display screen of the computer system.

In accordance with the position detector according to the second embodiment, since the magnetization pattern is magneto-optically recorded on the ball 2 as described above, it is possible to precisely record the magnetic pattern, e.g., at intervals of several tens μm~several hundreds μm. Further, since it is possible to precisely magneto-optically record the magnetization pattern at intervals of several ten μm~several hundreds μm, the size of the ball 2 can be reduced to, e.g., less than several mm. Followed by this, this position detector can become compact to such a degree that it is as small as a so called ball-point pen. Thus, operability can be improved. Further, since the magnetization pattern is magneto-optically recorded, an inconvenience such that the dot pattern is peeled away as in the case where the dot pattern is painted can be prevented. This can contribute to precise detection of position. Thus, durability can be also improved.

From the description above, the position detector can become more compact than the conventional so called mouse. Thus, operability of the position detector can be improved to a greater degree than the mouse. Further, since any dedicated board as in the case of the conventional tablet is not required, the position detector can become compact to a larger degree, and can be made up at low cost. This can contribute to popularization of the computer system.

Further, since position information and distance information outputted from the position detector are exactly the same as position information and distance information outputted from conventional so called mouse existing computer systems, etc. can be used as they are without altering or modifying those computer systems, etc.

In addition, in accordance with the position detector according to the second embodiment, since there is no change of the focal point of a reflected light irradiated onto the photo detector 55, there is no necessity of providing any servo system for focus control, etc. Thus, the position detector can be of extremely simple structure. This can contribute to realization of low cost.

A position detector according to a third embodiment of this invention will now be described.

Figure 9:
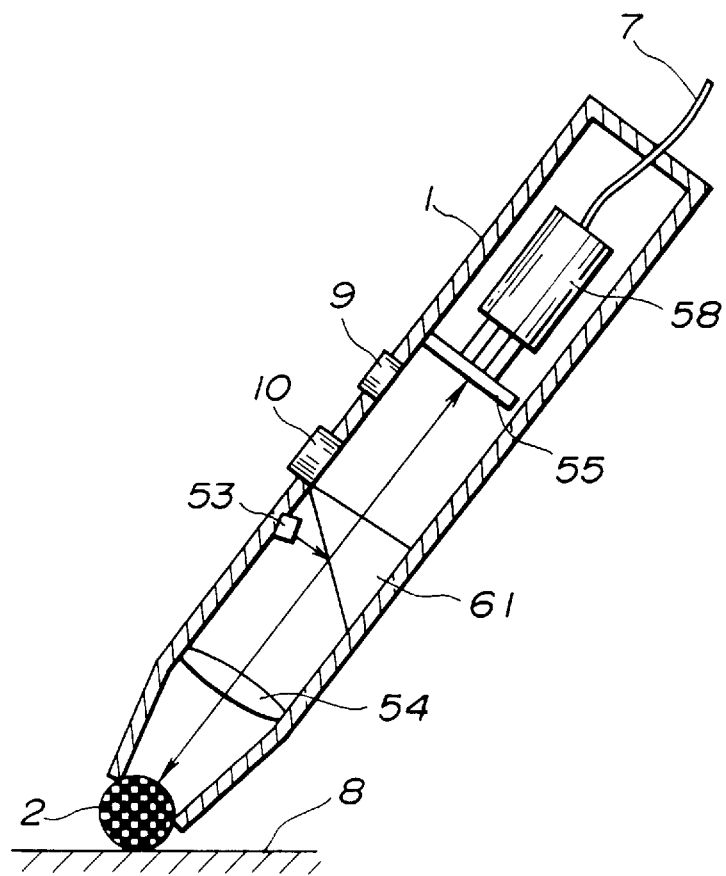
FIG. 9 is a cross sectional view showing the configuration of a position detecting apparatus according to a third embodiment of this invention.

The position detector according to the third embodiment employs a light detecting system different from that of the position detector according to the second embodiment mentioned above. This light detecting system is constructed as shown in FIG. 9. Namely, a laser beam from light source 53 is reflected by a beam splitter 61, and a reflected light thus obtained is irradiated onto ball 2 having a magneto-optically recorded magnetization pattern through object lens 54. A reflected light from the ball 2 is received by the photo detector 55 through the beam splitter 61.

When such a configuration is employed, the same effects/advantages as those of the position detector according to the second embodiment described above can be provided.

It is to be noted that operations except for the above are the same as those of the position detector according to the second embodiment described above, and the same reference numerals are respectively attached to the same components as those of the position detector according to the second embodiment and their explanation is omitted here.

A position detector according to a fourth embodiment will now be described.

Figure 10:
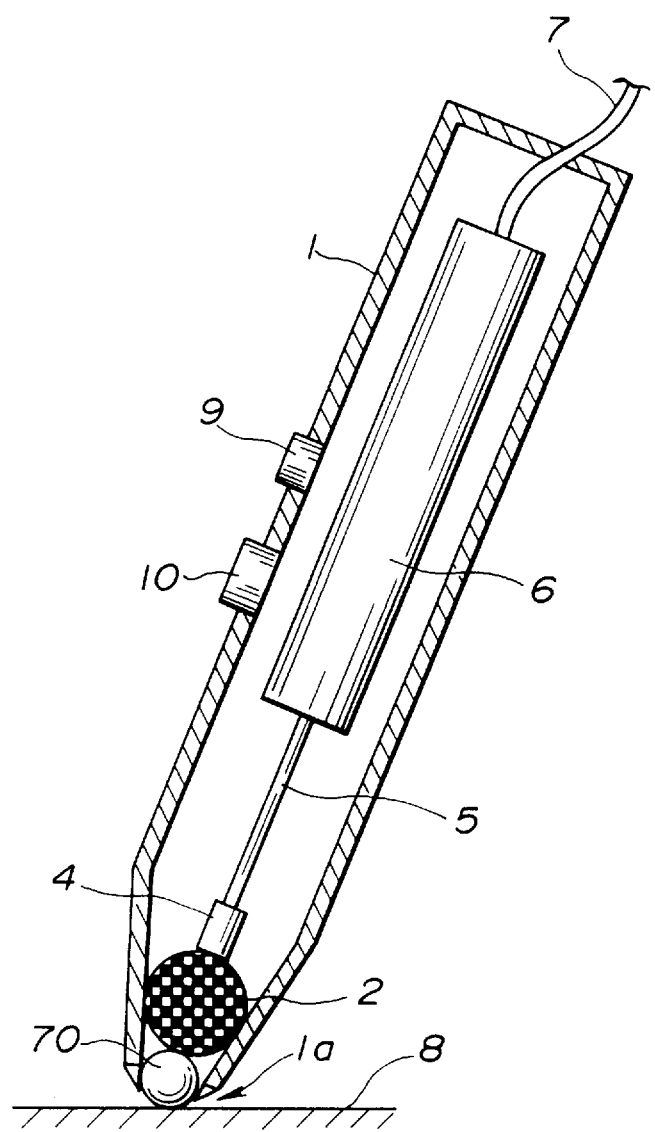
FIG. 10 is a cross sectional view showing the configuration of a position detecting apparatus according to a fourth embodiment of this invention.

The position detector according to the fourth embodiment is of a structure as shown in FIG. 10 such that the ball 2 having a magnetically recorded dot pattern or magneto-optically recorded magnetization pattern is provided within the tubular case 1, and a second ball 70 is rotatably provided at a front end portion 1a of the case 1 in a manner to be in contact with the ball 2. Since the second ball 70 is in contact with the ball 2, when the second ball 70 rotates, the ball 2 also rotates therewith.

When such a configuration is employed, the ball 2 on which the dot pattern is magnetically recorded can be prevented from being directly in contact with the desk 8. For this reason, the ball 2 can be prevented from being magnetized, and durability of the position detector can be still more improved.

It is to be noted that other operations except for the above in the position detector according to the fourth embodiment are the same as those of the position detector according to the first embodiment, and the same reference numerals are respectively attached to the same components as those of the first embodiment and the explanation thereof is omitted.

Figure 11:
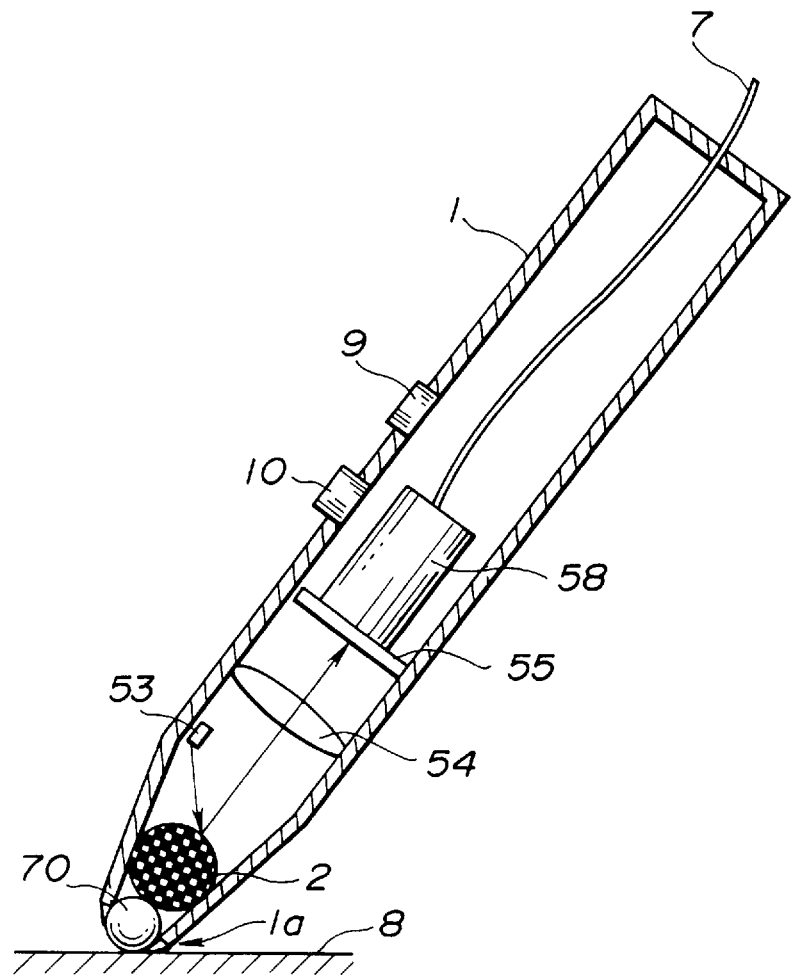
FIG. 11 is a cross sectional view showing the configuration of a position detecting apparatus according to a fifth embodiment of this invention.

Also in the second and third embodiments, a configuration similar to that of the fourth embodiment may be employed. Namely, a fifth embodiment shown in FIG. 11 is characterized in that a second ball 70 is provided similarly to the fourth embodiment in the second embodiment shown in FIG. 8.

Figure 12:
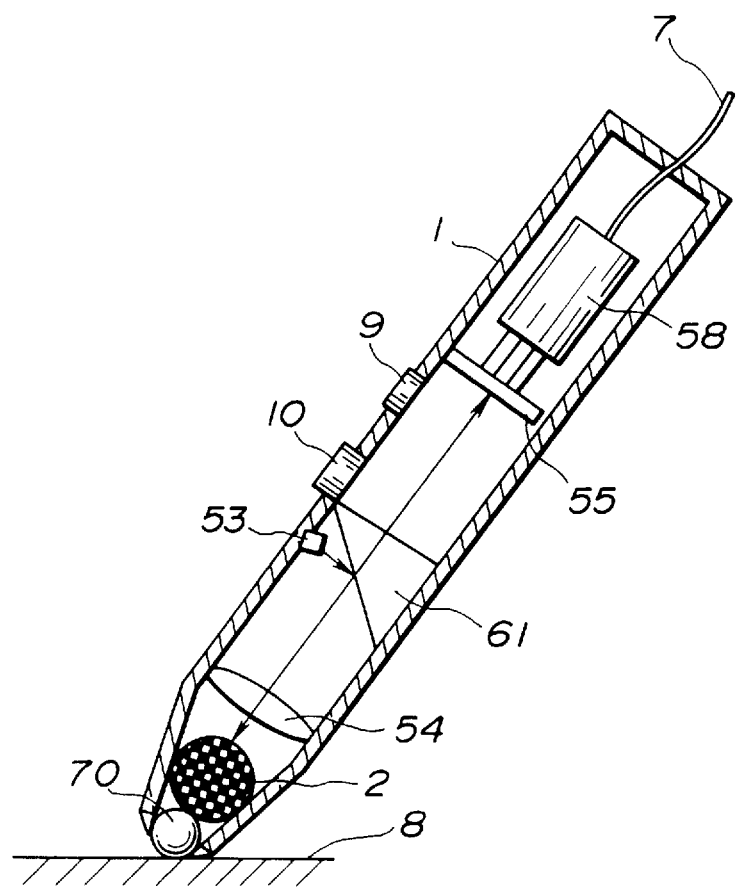
FIG. 12 is a cross sectional view showing the configuration of a position detecting apparatus according to a sixth embodiment of this invention.

In addition, a sixth embodiment shown in FIG. 12 is characterized in that a second ball 70 is provided similarly to the fourth embodiment in the third embodiment shown in FIG. 9.

Having described specific preferred embodiments of the present invention with reference to the accompanying drawings, it is to be understood that the invention is not limited to those precise embodiments, and that various changes and modifications may be affected therein by one skilled in the art without departing from the spirit or the scope of the present invention and defined in the appended claims.

What is claimed is:

1. A position detecting apparatus comprising:

a tubular case;

a first ball on which a predetermined repetitive pattern comprising a plurality of independent marks is magneto-optically recorded, the first ball being disposed completely internally within the tubular case for rotation in desired directions relative to the tubular case;

a second ball disposed within the tubular case in rotatable contact with the first ball and having a portion exposed to an external portion of the tubular case so that motion of the tubular case across an external surface contacted with the second ball causes rotation of the first and second balls;

a light source provided within the tubular case for irradiating a laser beam onto the first ball;

magneto-optical detecting means having a plurality of adjoining detecting portions arranged in a matrix form, the magneto-optical detecting means receiving the laser beam reflected by the first ball to thereby detect the predetermined repetitive pattern; and position detecting means for carrying out position detection based on a detection output from the magneto-optical detecting means.

2. A position detecting apparatus according to claim 1, wherein a dimension of each of said plurality of independent marks is less than a dimension of each of said detecting portions.

3. A position detecting apparatus according to claim 2, wherein said plurality of adjoining detecting portions comprises nine detecting portions and said matrix form is three by three.

4. A position detecting apparatus according to claim 3, wherein a distance between each of said plurality of independent marks is greater than the width of three adjoining detecting portions.

5. A position detecting apparatus according to claim 4, wherein said plurality of independent marks comprises a plurality of dots.

* * * * *